(12) United States Patent
Ohbi

(10) Patent No.: US 6,643,452 B1
(45) Date of Patent: Nov. 4, 2003

(54) RECORDED MEDIUM, REPRODUCING APPARATUS, RECORDING APPARATUS, AND REPRODUCING METHOD AND RECORDING METHOD

(75) Inventor: Seiji Ohbi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/463,797

(22) PCT Filed: Jun. 9, 1999

(86) PCT No.: PCT/JP99/03088

§ 371 (c)(1),
(2), (4) Date: Mar. 13, 2000

(87) PCT Pub. No.: WO99/65033

PCT Pub. Date: Dec. 16, 1999

(30) Foreign Application Priority Data

Jun. 9, 1998 (JP) ............................................. 10-160992
Jun. 9, 1998 (JP) ............................................. 10-160993

(51) Int. Cl.[7] ................................................. H04N 5/91
(52) U.S. Cl. ......................... 386/95; 386/125; 386/126; 369/30.25
(58) Field of Search ......................... 386/98, 125, 126, 386/95, 68, 69, 70, 124; 369/30.25, 30.03; H04N 5/91

(56) References Cited

U.S. PATENT DOCUMENTS

| | | | | |
|---|---|---|---|---|
| 5,838,823 A | * | 11/1998 | Ancessi ........................ | 382/232 |
| 5,870,523 A | * | 2/1999 | Kikuchi et al. .............. | 386/112 |
| 6,181,870 B1 | * | 1/2001 | Okada et al. .................. | 386/95 |
| 6,262,956 B1 | * | 7/2001 | Tsuda ........................ | 369/47.16 |
| 6,347,185 B1 | * | 2/2002 | Takahashi et al. ............ | 386/95 |

* cited by examiner

*Primary Examiner*—Vincent Boccio
*Assistant Examiner*—James A Fletcher
(74) *Attorney, Agent, or Firm*—Oblon, Spivak, McClelland, Maier & Neustadt, P.C.

(57) ABSTRACT

By packetizing main data to be recorded in a program area while providing each of the packets with a header (packet property) for managing the data length of individual packets, and further providing a management area (packet index) for batched management of a pack in managing the pack of a plurality of aggregated packets, reproduction of the header (packet property) included in the individual packs at the time of access and reproduction of the management area (packet index) on the inner circle in advance enable access to the individual packets included in the whole pack (that is, the aggregated packets).

19 Claims, 16 Drawing Sheets

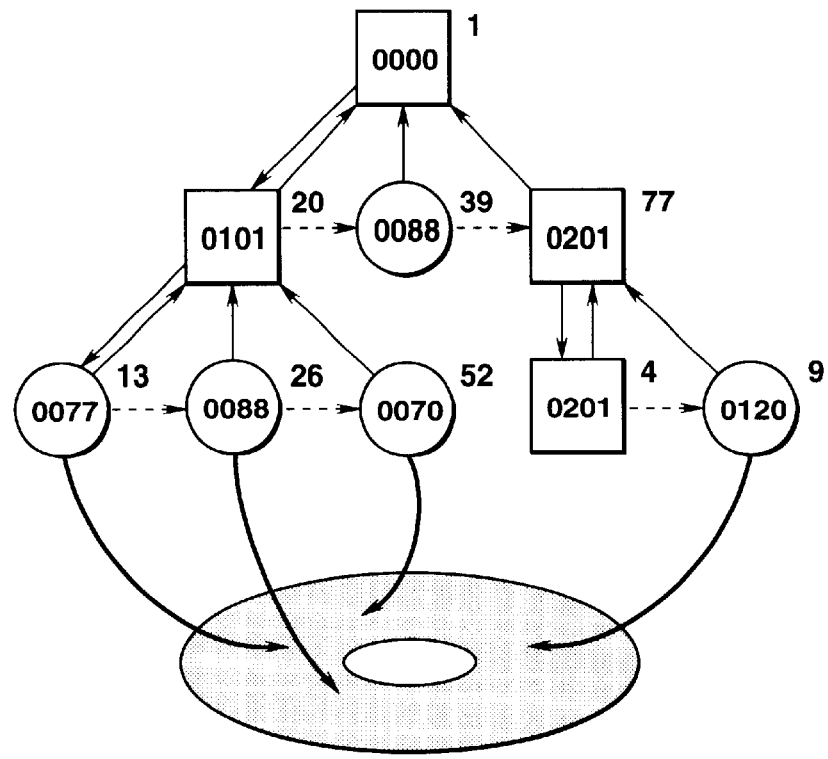
 : FOLDER   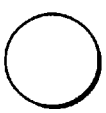 : TRACK   ⟶ : CHILD TRACK/DATA
--▶ : NEXT TRACK
0070 : ID    52 : DESCRIPTOR NUMBER   ⟶ : PARENT FOLDER
FIG.6

| Index | Type | | | Marked | Edited |
|---|---|---|---|---|---|
| | | 0 | 0 | | |

INDEX ATTRIBUTES 0 0 0 0 : Movie packet index
0 0 0 1 : Sound packet index
0 1 0 0 : Packed movie packet index
0 1 0 1 : Packed sound packet index
1 0 0 0 : Link pointer index

FIG.11

RECORDED MEDIUM, REPRODUCING APPARATUS, RECORDING APPARATUS, AND REPRODUCING METHOD AND RECORDING METHOD

TECHNICAL FIELD

This invention relates to a recording medium in which a plurality of packets recorded in a program area are aggregated and which has a management area for batched management of the aggregated packets, a reproducing device for reproducing data from the recording medium, a recording device for recording data to the recording medium, a reproducing method, and a recording method.

BACKGROUND ART

Recently, there is known a recording device for recording image signals and audio signals of a dynamic image or a still image shot by a user to a recording medium such as an optical disc or a magnetic tape. In the conventional recording device, in the case where the user shoots images, the recording position of shots that are individually shot is managed in a management area.

In this case, with an ordinary optical disc, the recording position is managed in a management area referred to as TOC (table of contents), but it has a problem that the number of manageable shots is finite. Specifically, if shot each consisting of 100 Kbytes are recorded onto a recording medium having a capacity 640 Mbytes, approximately 6400 shots can be recorded. However, if the number of shots that can be actually managed in the management area is limited to 1000, recording cannot be carried out further even though a recordable area of approximately 540 Mbytes is left on the optical disc. Thus, there arises a problem that the recording area cannot be effectively utilized.

FIGS. 1A and 1B show a disc image of a conventional optical disc and a table showing the management form of its management area TOC, respectively. In the case where three shots are recorded as shown in FIG. 1A, the recording start position (start address) and the recording end position (end address) of each shot are managed in the from of table as shown in FIG. 1B, in the TOC as the management area. However, if the number of shots managed in the table is finite, there is an inconvenience that recording cannot be carried out further even though the recording capacity is left in a program area, which is a recordable area.

DISCLOSURE OF THE INVENTION

In view of the foregoing problem, it is an object of the present invention to provide a recording medium in which main data to be recorded in a program area is packetized into packets each having a header (packet header) for managing the data length of the individual packet, and in which a management area (packet index) for batched management of a pack in aggregating and managing a plurality of packets as a pack is provided so that the individual packets included in the entire pack (that is, aggregated packets) can be accessed by reproducing the header (packet property) included in each pack at the time of access and reproducing the management area (packet index) on the inner circle in advance, and a reproducing device for reproducing data from the recording medium.

It is another object of the present invention to provide a recording device in which the operation is switched between management of an aggregated plurality of packets and management of each of individual packets in accordance with the quality of contents, which is a recording target.

A recording medium according to the present invention comprises: a program area in which a plurality of aggregated unit packets are discretely recorded as a pack, each packet consisting of a header section having data length of the entire packet managed therein and a main data section; a first management area for managing the recording address of the packets in the program area; and a second recording area in which the total number of packets included in the pack of the plurality of aggregated packets and the total length of data included in the pack of the plurality of aggregated packets are managed.

A reproducing device according to the present invention is adapted for reproducing data from a recording medium including a program area in which a plurality of aggregated unit packets are discretely recorded as a pack, each packet consisting of a header section having data length of the entire packet managed therein and a main data section, a first management area for managing the recording address of the packets in the program area, and a second recording area in which the total number of packets included in the pack of the plurality of aggregated packets and the total length of data included in the pack of the plurality of aggregated packets are managed. The reproducing device comprises: reproducing leans for reproducing the first management area, the second management area and the program area; storage means for storing management information reproduced from the first management area and the second management area by the reproducing means; and control means for controlling transfer of the reproducing means on the basis of the management information stored in the storage means when access to an arbitrary pack of the plurality of aggregated packets is instructed.

A recording device according to the present invention is adapted for recording digital video signals to a recording medium including a program area in which a plurality of aggregated unit packets are discretely recorded, each packet consisting of a header section having management information recorded therein and a main data section, and a management area in which first management information consisting of the total number of packets included in a pack of the plurality of aggregated packets and the total length of data included in the pack of the plurality of aggregated packets or second management information consisting of the data length of each of the packets is selectively managed. The recording device comprises: blocking means for blocking inputted digital video signals by each predetermined length; discrimination means for discriminating the quality of the blocked digital video signals; first management information generation means for generating the first management information in the case where it is discriminated by the discrimination means that the digital video signals have low quality; and recording means for recording the first management information generated by the first management information generation means to the management area.

Also, a recording device according to the present invention is adapted for recording digital audio signals to a recording medium including a program area in which a plurality of aggregated unit packets are discretely recorded, each packet consisting of a header section having management information recorded therein and a main data section, and a management area in which first management information consisting of the total number of packets included in a pack of the plurality of aggregated packets and the total length of data included in the pack of the plurality of aggregated packets or second management information consisting of the data length of each of the packets is selectively managed. The recording device comprises: blocking means for blocking inputted digital audio signals by each predetermined length; memory means for storing the blocked digital audio signals; discrimination means for discriminating the quality of data stored in the memory means; first management information generation means for generating the first management information in the case where it is discriminated by the discrimination means that a predetermined quantity or more of the blocked digital audio signals are stored in the memory means; and recording means for recording the first management information generated by the first management information generation means to the management area.

A reproducing method according to the present invention is adapted for reproducing data from a recording medium including a program area in which a plurality of aggregated unit packets are discretely recorded as a pack, each packet consisting of a header section having data length of the entire packet managed therein and a main data section, a first management area for managing the recording address of the packets in the program area, and a second recording area in which the total number of packets included in the pack of the plurality of aggregated packets and the total length of data included in the pack of the plurality of aggregated packets are managed. The reproducing method comprises: a step of reproducing the first management area, the second management area and the program area; a step of storing management information reproduced from the first management area and the second management area to a memory; a step of discriminating the presence/absence of an instruction to access an arbitrary pack of the plurality of aggregated packets; and a step of accessing an arbitrary packet designated by the access instruction on the basis of the management information stored in the memory.

A recording method according to the present invention is adapted for recording digital video signals to a recording medium including a program area in which a plurality of aggregated unit packets are discretely recorded as a pack, each packet consisting of a header section having data length of the entire packet managed therein and a main data section, and a management area in which first management information for managing the total number of packets included in a pack of the plurality of aggregated packets and the total length of data included in the pack of the plurality of aggregated packets or second management information for managing the data length of each of the packets is selectively managed. The recording method comprises: a step of discriminating the quality of blocked digital video signals; a step of generating the first management information in the case where it is discriminated at the step of discriminating that the blocked digital video signals have low quality; and a step of recording the generated first management information to the management area.

Moreover, a recording method according to the present invention is adapted for recording digital audio signals to a recording medium including a program area in which a plurality of aggregated unit packets are discretely recorded as a pack, each packet consisting of a header section having data length of the entire packet managed therein and a main data section, and a management area in which first management information for managing the total number of packets included in a pack of the plurality of aggregated packets and the total length of data included in the pack of the plurality of aggregated packets or second management information for managing the data length of each of the packets is selectively managed. The recording method comprises: a step of blocking inputted digital audio signals; a step of storing the blocked digital audio signals to a memory; a step of discriminating whether the quantity of digital audio signals stored in the memory is equal to or greater than a predetermined quantity; a step of generating the first management information in the case where it is discriminated at the step of discriminating that the quantity of blocked digital audio signals stored in the memory is equal to or greater than a predetermined quantity; and a step of recording the generated first management information to the management area.

BRIEF DESCRIPTION OF THE DRAWINGS

FIG. 6 schematically shows an exemplary hierarchical structure of a folder on the disc.

FIG. 11 schematically shows the structure of index attributes on the disc.

BEST MODE FOR CARRYING OUT THE INVENTION

A preferred embodiment of the present invention will now be described in detail with reference to the drawings.

Figures 1A, 1B:
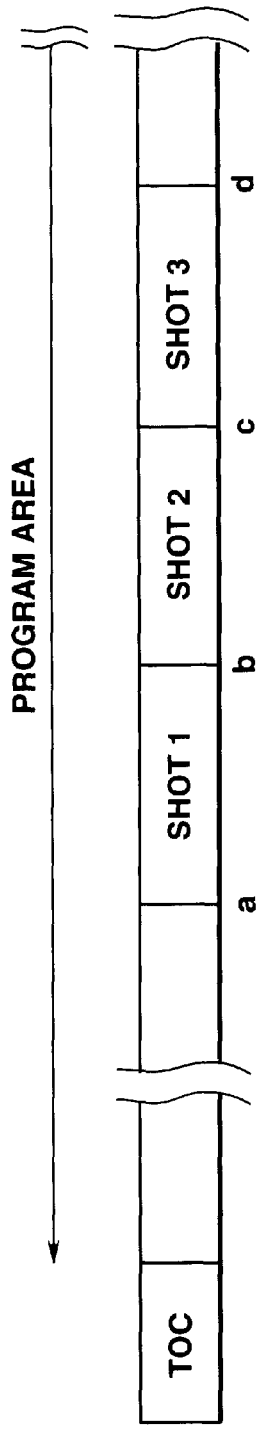
FIGS. 1A and 1B schematically show a disc image of a conventional optical disc and the management from of its management area TOC.
Figure 2:
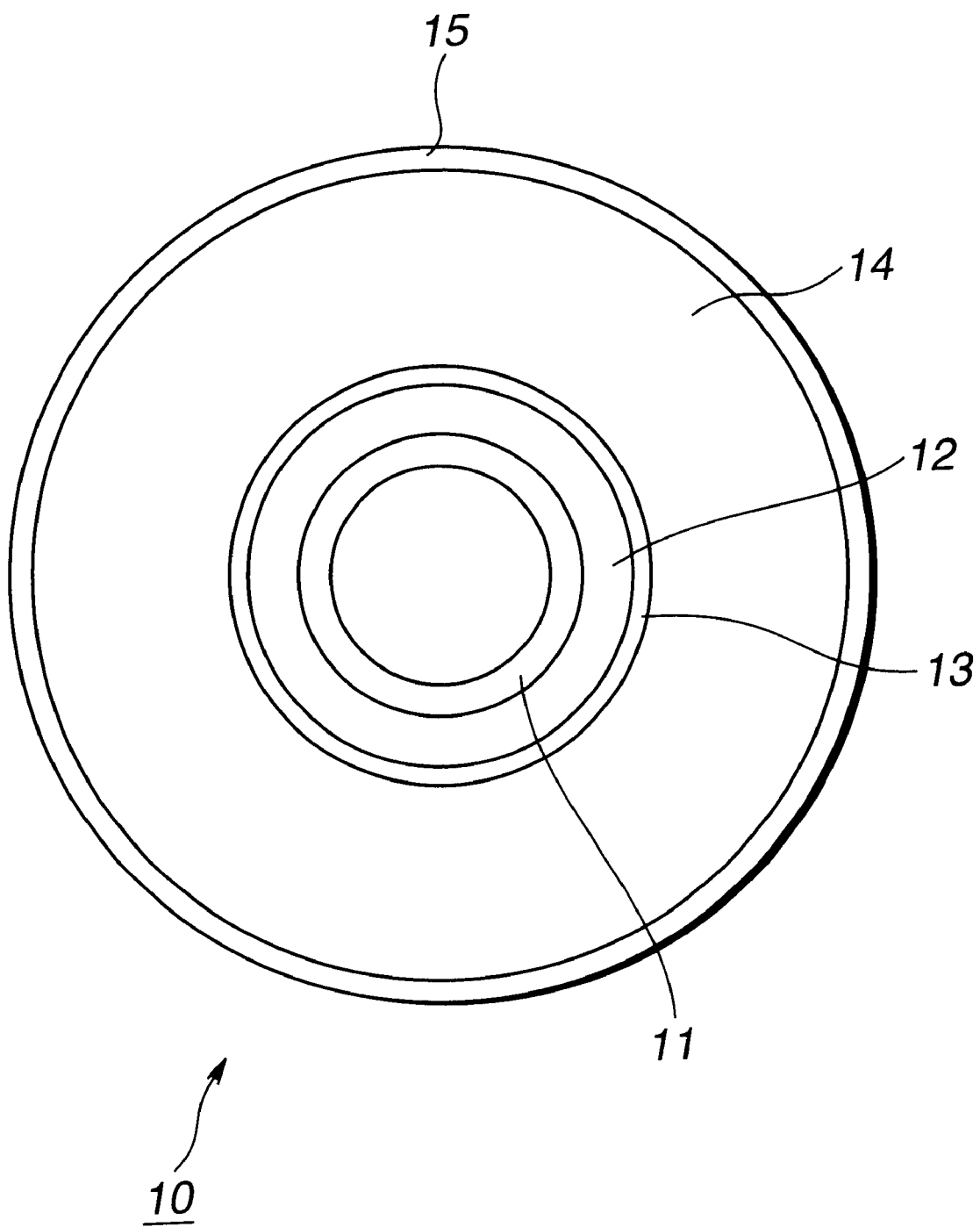
FIG. 2 is a plan view schematically showing the structure of a disc to which the present invention is applied.
Figure 3:
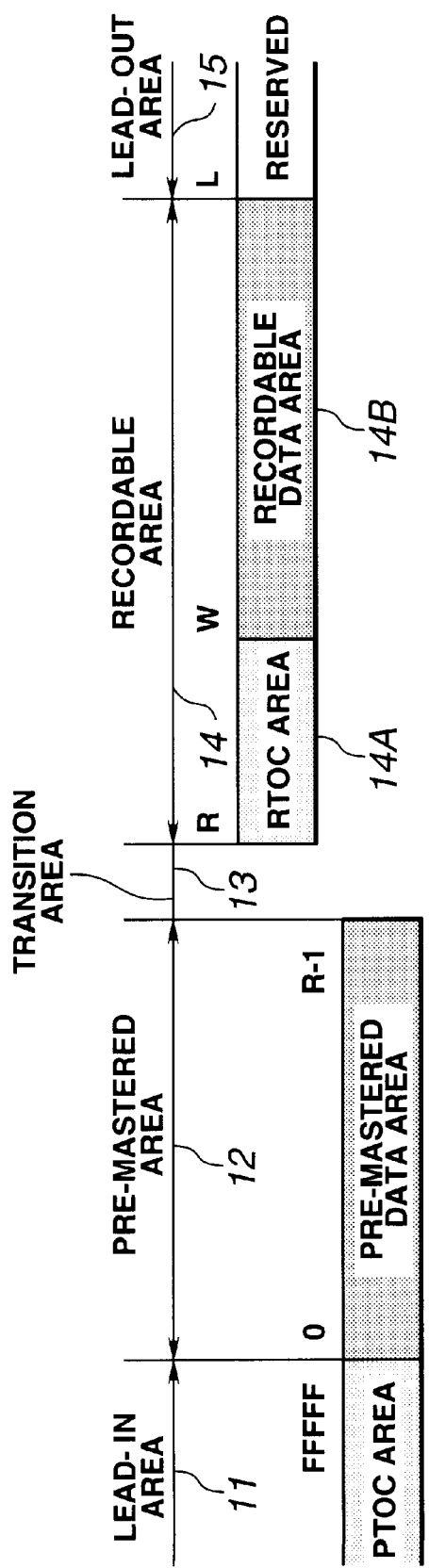
FIG. 3 shows the layout of each area on the disc.

The present invention is applied to a disc 10 of the structure, for example, as shown in FIGS. 2 and 3.

On this disc 10, various information recording areas are provided in the order of a lead-in area 11, a pre-mastered area 12, a recordable area 14 and a lead-out area 15 from the inner circle. A transition area 13 is provided between the pre-mastered area 12 and the recordable area 14. The pre-mastered area 12 may be omitted.

The lead-in area 11 consists of a PTOC area in which a pre-mastered TOC (PTOC) is repeatedly recorded over the whole area.

The PTOC is a TOC (table of contents) that cannot be rewritten and records the physical characteristics of the disc and the management information of the pre-mastered area. However, the management information is not used in the case where an RTOC exists. The PTOC is repeated recorded, with a data sector such that the physical sector address (PSA) of a physical cluster having 0 at all the lower two bits of the physical cluster address (PCA) of the PTOC area is 0, as a leading sector.

The pre-mastered area 12 consists of a pre-mastered data area in which main information prepared at the time of manufacture is recorded.

The recordable area 14 includes an RTOC (recordable TOC) area 14A and a recordable data area 14B. In the RTOC area 14A, three sets of RTOCs and a record power calibration area are arranged. The RTOC is a TOC that can be rewritten and records the physical characteristics of the disc and the management information of the pre-mastered data area and the recordable data area. However, the PTOC is used in the case where the recordable data area is unused. The RTOC is repeatedly recorded three times from a position advanced by 16 PCAs from the leading end of the RTOC area.

Main information is recorded in the pre-mastered area 12 and the recordable area 14.

No information is recorded in the lead-out area 15 on the disc 10.

On this disc 10, the TOC (table of contents) is the aggregate of recording of the physical characteristics of the disc and recording of all the necessary information for managing all the tracks and folders on the disc. The length of one set of TOC is 64 TOC blocks.

Figure 4:
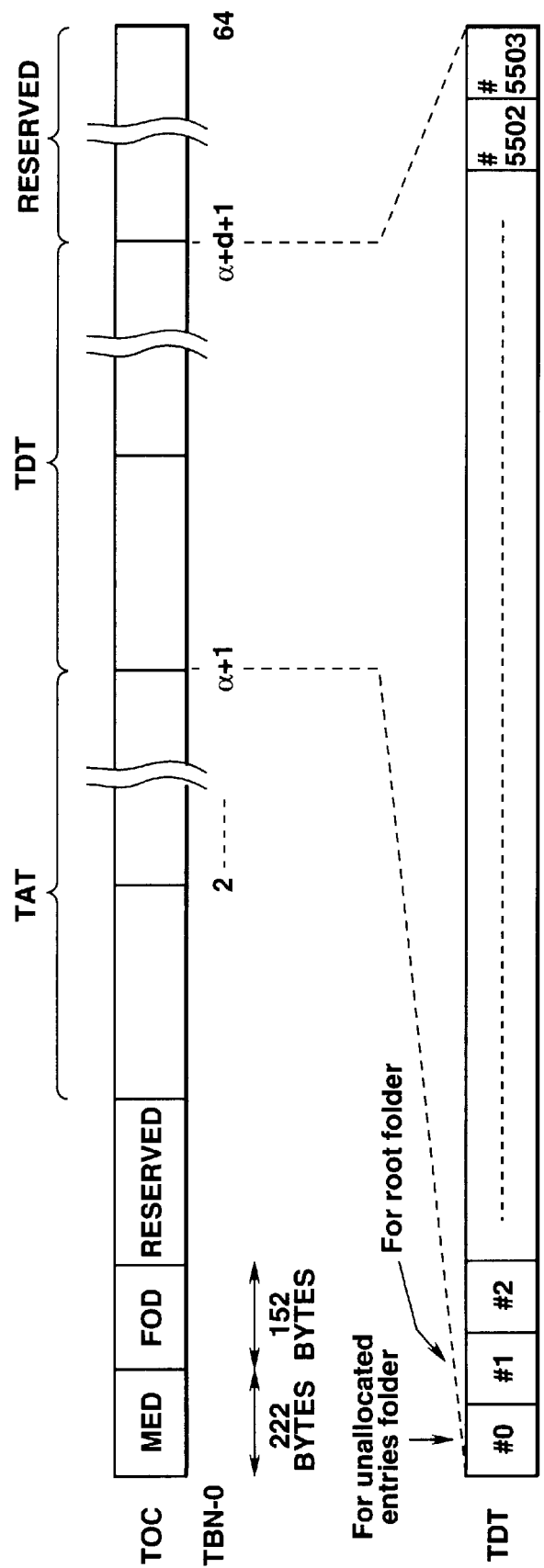
FIG. 4 schematically shows the structure of TOC on the disc.

In one set of TOC, a medium descriptor (MED), a format descriptor (FOD), a track allocation table (TAT), and a track description table (TDT) exist, as shown in FIG. 4.

In a leading TOC block (TBN0), the medium descriptor (MED) and the format descriptor (FOD) are arranged. In the subsequent TOC blocks, the track allocation table (TAT) and the track description table (TDT) are arranged. The starting position and size thereof are designated by the format descriptor (FOD). 0 is written in all the areas that are not used in the TOC.

A TOC block in this case is a data sector existing in the PTOC or RTOC. To the respective TOC blocks, TOC block numbers (TBN) of consecutive integer values starting at 0 are allocated from the leading end of the PTOC or RTOC to which those TOC blocks belong.

The medium descriptor (MED) describes the physical characteristics of the medium, and consists of 256 bytes including medium identifier of four bytes, disc type of one byte, MED identifier of eight bytes, recordable area start address of three bytes, RTOC start address of three bytes, recordable data area start address of three bytes, lead-out area start address of three bytes, record power 1 of one byte and record power 2 of one byte.

In the medium identifier (BP0) field, a byte string representing the format of this disc is recorded.

In the disc type (BP4) field, a code representing the type of disc (read-only disc, recordable disc, or hybrid disc) is recorded.

In the MED identifier (BP8) field, data indicating that this logical block is the medium descriptor is recorded four times.

In the recordable area start address (BP17) field, the start address of the recordable area is recorded.

In the RTOC start address (BP21) field, the start address of the RTOC is recorded.

In the recordable data area start address (BP25) field, the start address of the recordable data area is recorded.

In the lead-out area start address (BP29) field, the start address of the lead-out area is recorded.

In the record power 1 (BP32) field, a recommended value of laser output at the time of standard linear velocity recording is recorded.

In the record power 2 (BP33) field, a recommended value of laser output at the time of double linear velocity recording is recorded.

The format descriptor (FOD) describes the logical format information of the medium, and consists of 256 bytes including format version of two bytes, allocation unit size of two bytes, TAT location of two bytes, TAT size of two bytes, TDT location of two bytes, TDT size of two bytes, maximum number of TDT entries of two bytes, number of pre-mastered allocation of two bytes, number of recordable allocation units of two bytes, number of unallocated recordable allocation units of two bytes, modification maker code of one byte, modification model code of one byte, modification serial number of two bytes, modification date and time of four bytes, created date and time of four bytes, boot record of two bytes, identification number of two bytes, and identification name of 64 bytes.

In the format version (BP0) field, the version number of this standard is recorded.

In the allocation unit size (BP2) field, the number of logical blocks included in one allocation unit is recorded.

In the TAT location (BP4) field, the number of the TOC block at which the track allocation table (TAT) starts is recorded.

In the TAT size (BP6) field, the number of TOC blocks used for the track allocation table (TAT) is recorded.

In the TDT location (BP8) field, the number of the TOC block at which the track description table (TDT) starts is recorded.

In the TDT size (BP10) field, the number of TOC blocks used for the track description table (TDT) is recorded.

In the maximum number of TDT entries (BP12) field, the maximum TDT entry number that is actually used is recorded.

In the number of pre-mastered allocation units (BP16) field, the number of allocation units in the pre-mastered data area is recorded.

In the number of recordable allocation units (BP20) field, the total number of allocation units in the recordable data area is recorded.

In the number of unallocated recordable allocation units (BP22) field, the number of unused allocation units in the recordable data area is recorded.

In the modification maker code (BP24) field, the number allocated to a maker of a device in which the RTOC is rewritten last is recorded.

In the modification model code (BP25) field, the number allocated to the device in which the RTOC is rewritten last by the maker thereof is recorded. The pre-mastered FOD is 0.

In the modification serial number (BP26) field, a value obtained by adding 1 to a previous value is recorded every time the RTOC is rewritten. It can be used for detecting mismatching of a plurality of RTOCs.

In the modification date and time (BP28) field, the date and time when the RTOC is recorded last is recorded.

In the created date and time (BP32) field, tie date and time when the RTOC is first recorded is recorded.

In the boot record (BP36) field, AUN of an allocation unit having boot record recorded therein is recorded.

In the identification number (BP38) field, a number for identifying the disc is recorded.

In the identification name (BP40) field, ASCII characters representing the name of disc is recorded.

Next, the track allocation table (TAT) is a table in which the state of all the allocation units on the disc is recorded. The TAT is arranged on consecutive TOC blocks. The number of the leading TOC block of the TAT and the number of secured TOC blocks are recorded in the format descriptor (FOD).

Each entry of the TAT table has a number starting at 0 and continuously increasing.

The numbers of a series of allocation units on a certain track in which data is stored can be learned in accordance with the following procedures.

1. The number of the leading allocation unit is obtained from the value of the data location field of the track descriptor expressing the track.
2. The state of that allocation unit is examined by the corresponding entry of the track allocation table (TAT). If the value is any of 0001h to FFEFh, that value is the number of the next allocation unit. Therefore, the procedure 2 is applied again. If the value is any of FFF8h to FFFFh, the last allocation unit is reached.

In principle, one entry is not linked from a plurality of entries. However, only in the case where the entry is the allocation unit at the last part of a track, it can be linked from the maximum of eight tracks. In this case, the number of links is managed in the entry of the track allocation table (TAT). Normally, the last allocation unit of the link is expressed by FFFFh. If the number of links is increased by one, the value is updated to a value obtained by subtracting 1 from the previous value (e.g., FFFFh is updated to FFFEh). On the contrary, if the number of links is reduced by one, the value is updated to a value obtained by adding 1 to the previous value. When the point is reached where there is no link from the state of FFFFh, the allocation unit is restored to the unused state.

The track description table (TDT) is a table storing a track descriptor, a folder descriptor or an unallocated track descriptors in which the data storage position on the track and information such as the parent-child relation between track and folder are described.

The track description table (TDT) is arranged on consecutive TOC blocks. The number of the leading TOC block and the number of secured TOC blocks are recorded in the format descriptor. One entry consists of 16 bytes and the total number of entries of the track description table (TDT) is a multiple of 128. The length of the track description table (TDT) is determined at the time of initialization and will not be changed later on. The maximum length of the track description table (TDT) is 43 TOC blocks, 5504 entries. To the respective entries, numbers starting at 0 and consecutively increasing are allocated as shown in the following Table 1, and one track descriptor or format descriptor is stored therein.

Table 1

Track Description Table (TDT)

| BP | +0 |
|---|---|
| 00000h | Entry 0 (for unallocated entries folder) |
| 00010h | Entry 1 (for root folder) |
| 00020h | Entry 2 |
| 00030h | Entry 3 |
| . | . |
| . | . |
| . | . |
| 157F0h | Entry 5503 |

At the entry number 1 (Entry 1), a folder descriptor describing the root folder is arranged. All the folders and tracks are arranged under the tree of this folder as the root. The root folder has an identification number of 0, has no link to the next track, and is a parent folder itself.

At the entry number 0, a virtual folder descriptor having an unallocated track descriptor as a child and describing an unallocated entries folder is arranged. The child track descriptor of this folder is an unallocated track descriptor having the minimum number. It has an identification number of 0, has link to the next track, and is a parent folder itself. It also has system and hidden attributes.

The unallocated track descriptor is a virtual track expressing an unused entry. The next track descriptor is an unallocated track descriptor having the next largest entry number.

At and after the entry number 2, arbitrary track descriptors or folder descriptors can be arranged.

Figure 5:
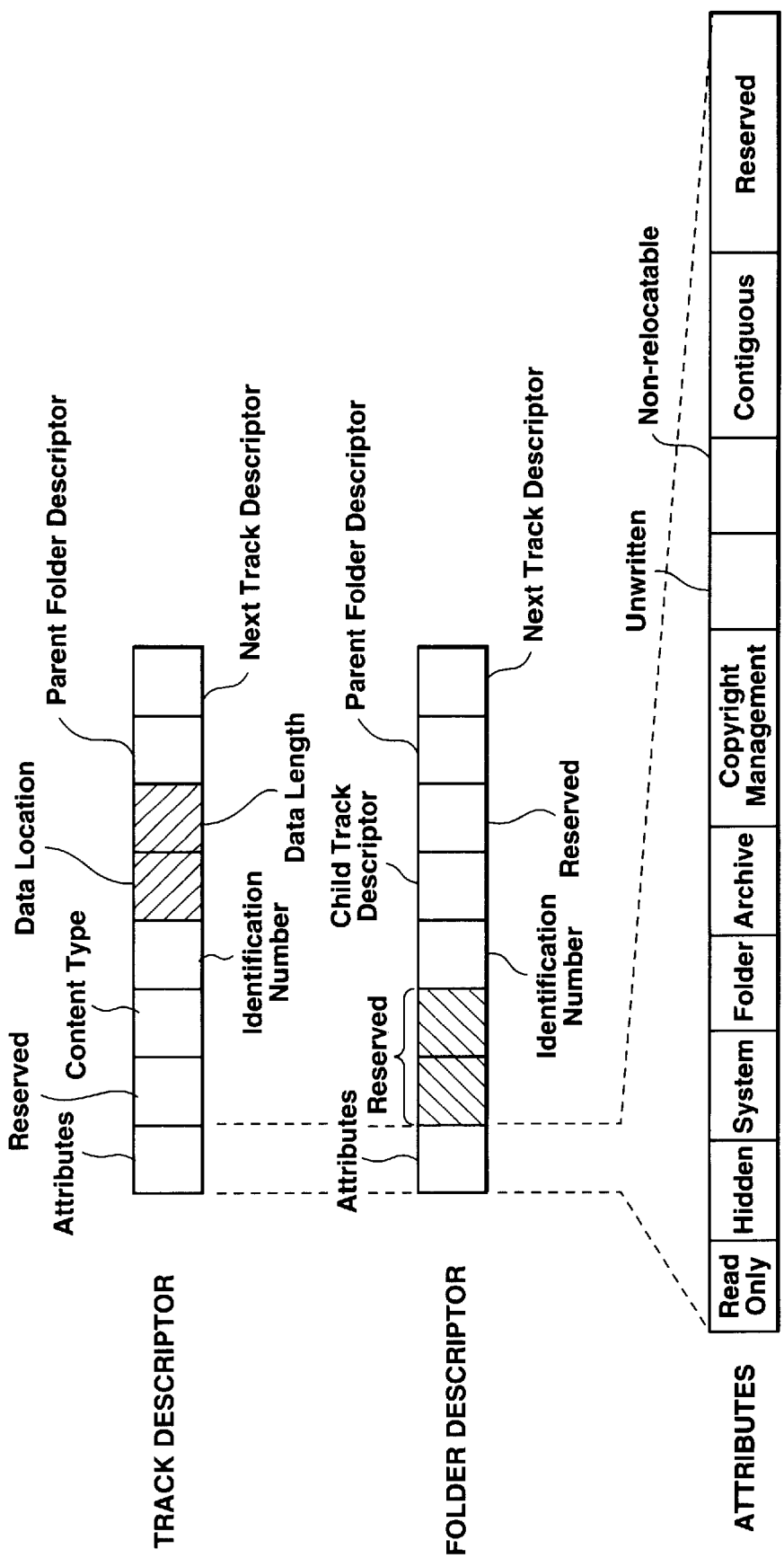
FIG. 5 schematically shows the structure of a track descriptor and a folder descriptor on the disc.

Furthermore, the track descriptor is arranged in the track description table and describes the attributes data storage position and hierarchical relation of a certain track. The track descriptor consists of 16 bytes including attributes of two bytes, reserved field of two bytes, content type of two bytes, identification number of two bytes, data location of two bytes, data length of two bytes, parent folder descriptor of two bytes, and next track descriptor, as shown in FIG. 5. The entry number of the track description table (TDT) that is actually stored is the number of this descriptor.

In the attributes (BP0) field, the attributes of this track are recorded. The folder bit is necessarily zero.

In the content type (BP4) field, the type of data stored on this track is recorded.

In the identification number (BP6) field, a numerical value for uniquely identifying this track in the parent folder.

In the data location (BP8) field, the number of the allocation unit in which the leading data of this track is stored is recorded. If the number is 0000h, this track has no actual data and 0 is recorded in the data length field.

In the data length (BP10) field, the number of allocation units in which data of this track is housed is recorded. If the number is 0, this track has not actual data and 0000h is recorded in the data location field.

In the parent folder descriptor (BP12) field, the number of the descriptor of the parent folder of this track is recorded.

The next track descriptor (BP14) is used for connecting a track/folder having the same parent folder as this track, in the form of a list starting with the parent folder. In this field descriptor number of a track or folder to be retrieved next to this track is recorded.

All the tracks and folders have attributes expressed by a two-byte bit field as shown in the following Table 2.

TABLE 2

Attributes

| Bit | Description | Contents |
| --- | --- | --- |
| 0 | Read only | ZERO or ONE |
| 1 | Hidden | ZERO or ONE |
| 2 | System | ZERO or ONE |
| 3 | Folder | ZERO or ONE |
| 4 | Archive | ZERO or ONE |
| 5–6 | Copyright Management | 0, 1, 2, 3 |
| 7 | Unwritten | ZERO or ONE |
| 8 | Non-relocatable | ZERO or ONE |
| 9–10 | Continuous | 0, 1, 2, 3 |
| 11–15 | Reserved | ZEROs |

If the read only (Bit0) field is ONE, this track/folder is a read-only track/folder and cannot be deleted. In the case of track, change of data is also inhibited.

If the hidden (Bit1) field is ONE, the presence of this track/folder is not known to a user of the device.

If the system (Bit2) field is ONE, this track/folder is an element constituting the system.

If the folder (Bit3) field is ONE, this element is a folder. If it is ZERO, the element is a track.

In the archive (Bit4) field, the bit is ONE in the case where there is any change in data, attributes and parent-child relation. Each device can be set to ZERO at an arbitrary time point.

In the copyright management (Bit5–6) field, copyright management information (CGMS) relating to the data of this track is recorded with a code shown in the following Table 3.

TABLE 3

Copyright Management

| Value | Description |
| --- | --- |
| 0 | Duplicate can be produced unlimitedly |
| 1 | No copyright management information is set |
| 2 | Duplicate can be produced only for one generation |
| 3 | Duplicate must not be produced |

In the unwritten (Bit7) field, there is a possibility that any logical cluster having a DRL signal written may be included in the allocation units secured for this recorded track. In the case of the pre-mastered track, the contents is necessarily ZERO.

In the non-relocatable (Bit8) field, the position and order of the allocation unit storing the data of this track therein must not be changed. In the case of the pre-mastered track, the contents is necessarily ONE.

In the contiguous (Bit9–10) field, allocation block allocating strategy with respect to this track is recorded with a code shown in the following Table 4. The application thereof depends on the mounting of each device.

TABLE 4

Contiguous

| Value | Description |
| --- | --- |
| 0 | Not particularly designated |
| 1 | Must be constituted by a single allocation unit chunk |
| 2 | As large allocation unit chunks as possible should be arranged in the order of allocation unit number |
| 3 | Arrangement method corresponding to application is defined |

On this disc 10, the maximum of 5502 items of information can be hierarchically classified and recorded by using the track description table (TDT) and the track allocation table (TAT) in accordance with the following track management system (TMS) for recording area allocation.

In this TMS, the allocation unit is the aggregate of one or more logical clusters of consecutive physical addresses on the same physical track, in the pre-mastered area and the recordable data area, and are the minimum unit for storage area management. To the respective allocation units, allocation unit numbers (AUN) of consecutive integer values starting at 0, which are unique in the disc, are allocated.

One allocation unit is constituted by one logical cluster, and the AUN is coincident with the LCN.

The allocation unit in the pre-mastered area is referred to as pre-mastered allocation unit, and the allocation unit in the recordable area is referred to as recordable allocation unit.

The aggregate of one or more allocation units of consecutive physical addresses on the same physical track is referred to as allocation unit chunk.

The minimum unit of a set of information (image, music, computer program, etc.) directly managed by this TMS is referred to as track. The attributes of the track are expressed by the track descriptor. The data included in the track is stored in zero or more allocation units arrayed at arbitrary positions in an arbitrary order.

A track consisting only of pre-mastered allocation units is referred to as pre-mastered track.

A track consisting only of recordable allocation units is referred to as recordable track. A track in which the pre-mastered allocation units and the recordable allocation units mixedly exist is not permitted.

In this track management system (TMS), the folder is the structure for managing a plurality of tracks as a group and is expressed by the folder descriptor. The respective tracks or folders belong to one folder (parent folder) and ultimately constitute a tree structure having the root folder as its root.

Each of the tracks/folders has a unique identification number inside the folder to which it belongs. For the identification number, an arbitrary 16-bit integer value except for FFFFh can be used. Each application can be associated with the type of data and the order by arbitrarily defining an allocation method for the value in advance. Also, each track has a 16-bit integer indicating the type of data.

To realize a hierarchical folder structure and to define the retrieval order for the tracks and folders, all the tracks and folders area connected to two types of linked lists.

One is a linked list indicating the parent folder of each track/folder. From this, to which folder each track/folder belongs can be immediately known. The other is a linked list having the parent folder at the leading end and sequentially connecting the tracks and folders belonging to the parent folder. From this linked list, the retrieval order for the tracks and folders inside the folder can be defined and quick retrieval can be carried out.

Since all the tracks and folders on the disc arranged in the tree structure starting with the root folder, the track/folder can be uniquely identified on the disc on the basis of the order of the identification numbers of the folders located in the route from the root folder and the track/folder itself.

An exemplary hierarchical structure of folders is shown in FIG. 6. The root folder has ID of 0000h and it has three child folder/tracks, that is, a folder 0101h , a track 0088h, and a folder 0201h. In FIG. 6, there are folder and tracks having the same ID. However, they have parent folders and are therefore independent of each other. The ID of folders and tracks is equal to the entry number (Entry#n) in the property table shown in FIG. 7.

Figure 7:
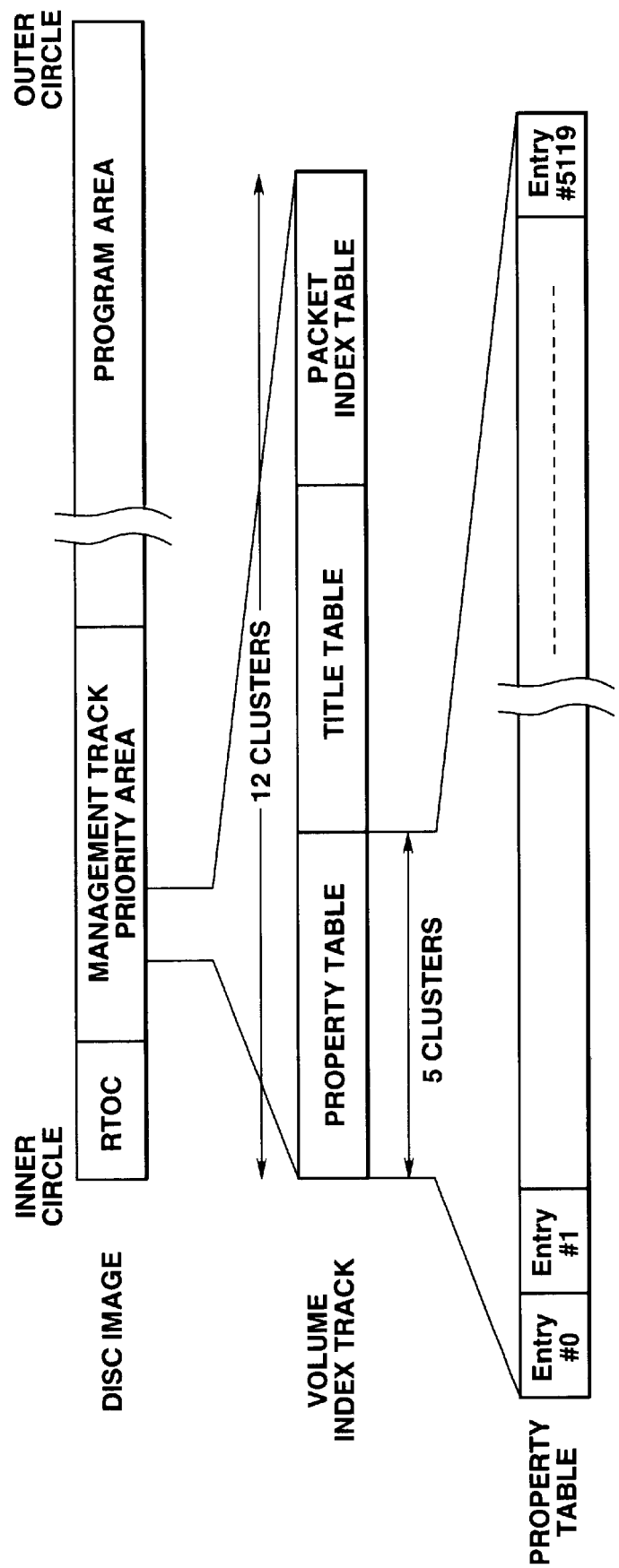
FIG. 7 schematically shows the structure of a recordable area on the disc.

On this disc 10, an area within 128 physical clusters from the leading end of both physical tracks of the recordable area is used as a management track priority area, as shown in FIG. 7, and the track having the management information recorded in this area is preferentially recorded.

In this management track priority area, a volume index track is arranged. The volume index track is a track on which volume property, shot property of all the shots in the volume, and auxiliary data property of folder property auxiliary data of the folder are recorded. On this volume index track, summary information of individual AV packets constituting the shots is also recorded.

The volume index track has information relating to the shots, folder and auxiliary data included in the volume. The size of the volume index track is 12 clusters, which are divided into areas of property table of five clusters, title table of five clusters, and packet index table of three clusters, from the leading end. To this volume index track, 1001h is allocated as ID.

The property table is the aggregate of property entries for recording the volume property of this volume and the property of the shot, folder and auxiliary data included in this volume. One entry consists of 32 bytes and a total 5120 entries (five clusters) are prepared. The leading entry is set at 0 and the property entry numbers are sequentially allocated.

At the entry number 0, the volume property is recorded. At the subsequent entry numbers, the properties of the shot, folder and auxiliary data are recorded. In this case, these properties are recorded at entries having the entry numbers equal to the values of lower 14 bits of the identification number of the corresponding folder or track. At all the entries that are not used, 0 is recorded.

Figure 8:
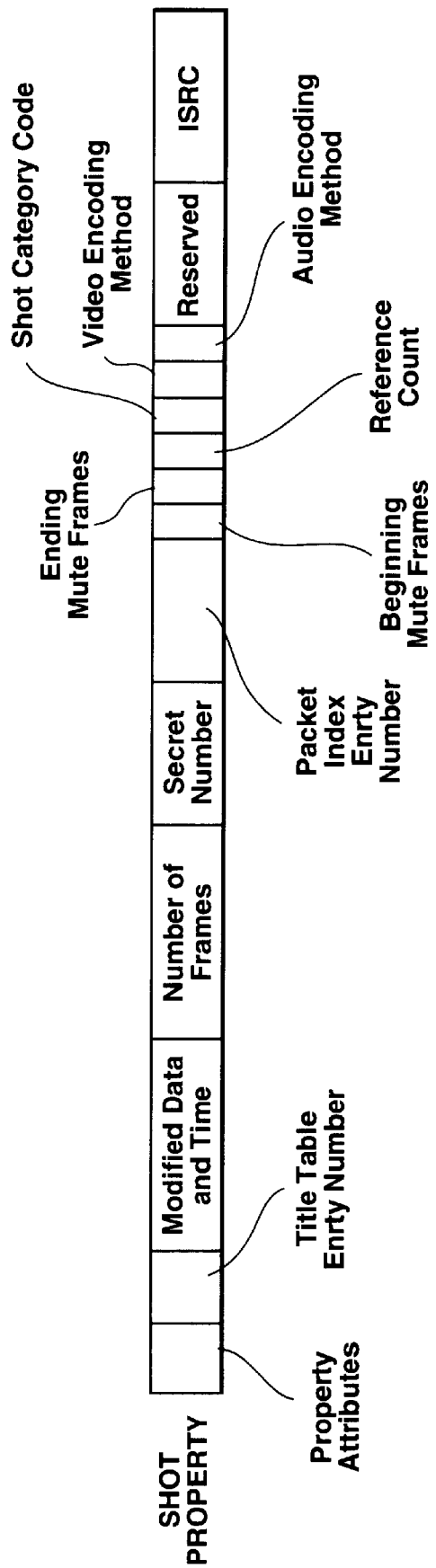
FIG. 8 schematically shows the structure of a shot property on the disc.

With respect to the shot property, the attributes of the shot are recorded in a structure defined as shown in FIG. 8. This shot property includes various fields such as property attributes, title table entry number, modified date and time, number of frames, secret number, packet index entry number, beginning mute frames, ending mute frames, reference count, shot category code, video encoding method, audio encoding method, ISRC and the like.

In the property attributes field, identification information of the type of property (record type, shot type, importance level, combined, quality level) is recorded.

As the record type in this property attributes field, the type of the property stored in this entry (shot, folder, auxiliary data, volume, reserved) is recorded. The shot type is effective when this is the shot property. The type of shot (sound shot, still shot (with sound), still shot (without sound), movie shot (without sound), movie shot, reserved) is recorded as the shot type. The importance level is effective when this is the shot property. The importance of this shot is recorded in the form of a numerical value of 0 to 3. Normally, 0 is recorded, which means the minimum importance. The combined is effective when this is the shot property. If it is 1, there is a possibility that the time stamp recorded in the AV packet of this shot is discontinuous. The quality level is effective when this is the shot property. The disc transfer speed required for seamless reproduction of the shot is recorded.

In the title table entry number field, the leading entry number of the title table in which actual data of the title (data name) of the corresponding shot is stored is recorded. In the case of nonuse, 0 is recorded.

In the modified date and time field, the time when the contents and order of the track of the corresponding shot, the shot property and the TMS attributes are modified last is recorded.

In the number of frames field, the number of video frames of the entire shot is recorded in the case of the movie shot, and the number of audio frames to be reproduced as sound is recorded in the case of the still shot or sound shot.

In the secret number field, the password number of the corresponding shot is recorded in the form of four-digit BCD. "0000" means nonuse.

In the packet index entry number field, the leading packet index entry number of the corresponding shot is recorded. If it is not used, 0 is recorded.

In the beginning mute frames field, the number of frames that are not displayed from the leading end is recorded with respect to the leading AV packet of the corresponding shot. If it is not particularly defined, 0 is recorded.

In the ending mute frames field, the number of frames that are not displayed last is recorded with respect to the last AV packet of the corresponding shot. If it is not particularly defined, 0 is recorded.

In the reference count field, the number of shots and shot links which refer to the corresponding shot track is recorded. Normally, 1 is recorded. Every time one shot link track for this shot is produced, the number is increased by one. Every time one shot link track is deleted, the number is reduced by one.

In the shot category code field, the classification code provided by the user to the corresponding shot is recorded.

In the video encoding method field, the same contents as those recorded in the packet property of the AV packet constituting the corresponding shot are recorded.

In the audio encoding method field, the same contents as those recorded in the packet property of the AV packet constituting the corresponding shot are recorded.

In the ISRC field, the international standard recording code for copyright management is recorded.

In the title table of the volume index track, the titles of the individual shots, folders and auxiliary data are registered.

Figure 9:
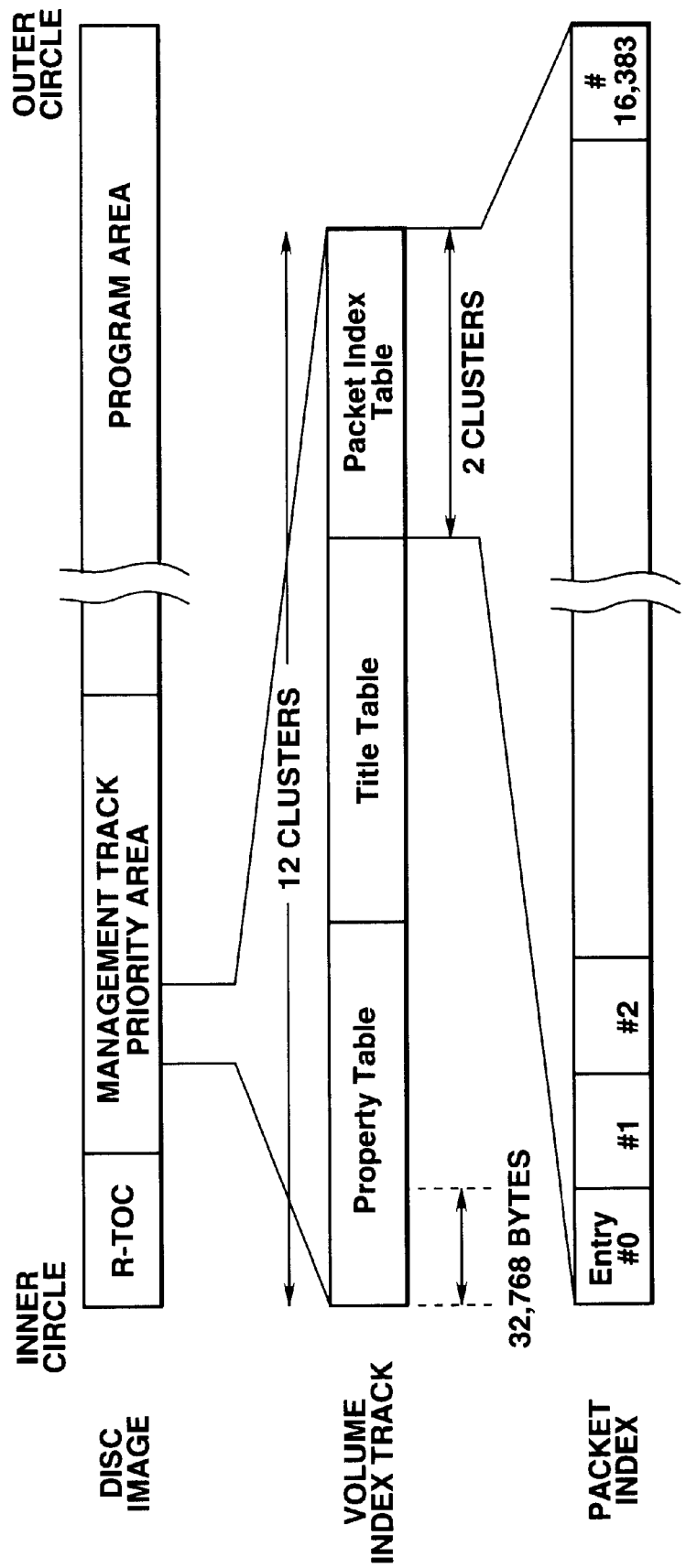
FIG. 9 schematically shows the structure of a packet index table on the disc.

In the packet index table of the volume index track, information about the data quantity and reproduction time of the corresponding packet are recorded. Wit respect to packets constituting a certain shot, each of these packets or a group of consecutive packets can have a packet index. The packet index table is a region for recording the packet index. In the packet index table, 16,384 packet index entries each consisting of four bytes can be arranged, as shown in FIG. 9. The leading entry is set at 0 and the packet index numbers in the increasing order are provided. In each packet index entry, any packet index is stored.

The index information of the logically consecutive packets constituting a certain shot is assumed to be logically consecutive on the index table. That is, the information must be physically consecutive or linked by a link pointer index. The link pointer index is recorded at an unused entry and connection is formed with the packet index number 0 set at the leading end.

The packet index includes five types of indexes, that is, movie packet index, packed movie packet index, sound packet index, packed sound packet index, and link pointer index, each having the structure defined by four bytes.

Figure 10:
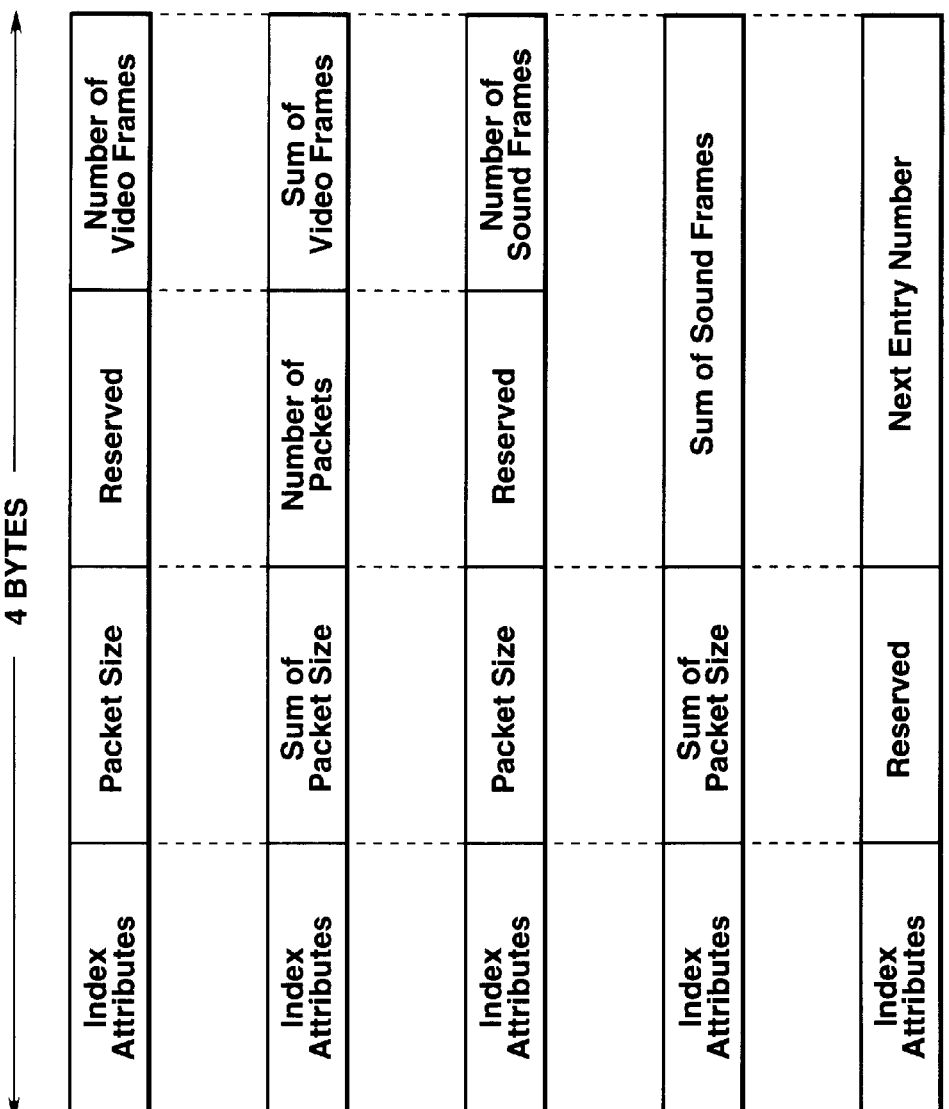
FIGS. 10A, 10B, 10C, 10D and 10E schematically show the structure of a packet index on the disc.

The movie packet index consists of four bytes, that is, index attributes (one byte), packet size (one byte), reserved (one byte), and number of video frames (one byte), as shown in FIG. 10A. This movie packet index corresponds to one movie packet constituting a movie shot or one AV packet constituting image data of a still shot.

The packed movie packet index consists of four bytes, that is, index attributes (one byte), sum of packet size (one byte), number of packets (one byte), and sum of video frames (one byte), as shown in FIG. 10B. This packed movie packet index corresponds to a plurality of consecutive movie packets constituting a movie shot.

The sound packet index consists of four bytes, that is, index attributes (one byte), packet size (one byte), reserved (one byte), and number of video frames (one byte), as shown in FIG. 10C. This sound packet index corresponds to one sound packet constituting a sound shot or constituting audio data of a still shot.

The packed sound packet index consists of four bytes, that is, index attributes (one byte), sum of packet size (one byte), and sum of sound frames (two bytes), as shown in FIG. 10D. This packed sound packet index constitutes a sound shot and corresponds to a plurality of consecutive sound packets.

The link pointer index consists of four bytes, that is, index attributes (one byte), reserved (one byte), and next entry number (two bytes), as shown in FIG. 10E. This link pointer index does not corresponds to any actual AV packet, but is prepared for logically linking entries which are located at a distance on the packet index table. This index is also used for linking all the unused entries.

The leading byte of the packet index represents the index attributes having a structure as shown in FIG. 11, which is commonly defined for each type. As the upper four bits of the leading byte of each packet index, index type indicating the type of packet index (movie packet index, packed movie packet index, sound packet index, packed sound packet index, or link pointer index) is recorded, and a marked bit and an edited bit are recorded as the lower four bits.

The marked bit of 1 indicates that a mark is appended to this packet. The edited bit of 1 indicates that the corresponding AV packet is at the start of recording or the leading part of a connection part. The time stamp of this packet is discontinuous with that of the AV packet immediately before.

As the packet size of the movie packet index and sound packet index, die value of the field of the same name in the packet property of the corresponding AV packet is recorded as it is. As the number of video frames, the value of the field of the same name in the packet entry of the corresponding AV packet is recorded as it is.

As the sum of packet size of the packed movie packet index and packed sound packet index, the sum of values of packet size in the packet property of the corresponding AV packet is recorded. As the sum of video frames, the sum of values of the number of video frames in the packet property of the corresponding AV packet is recorded.

As the number of sound frames of the sound packet index, the value of the field of the same name in the packet property of the corresponding AV packet is recorded as it is.

As the sum of sound frames of the packed sound packet index, the sum of values of the number of sound frames in the packet property of the corresponding AV packet is recorded.

Moreover, as the next entry number of the link pointer index, the entry number at which the packet index corresponding to the AV packet next to this shot is stored is recorded.

In the recordable area 13 of the disc 10, the AV packets are recorded as main information.

Figure 12:
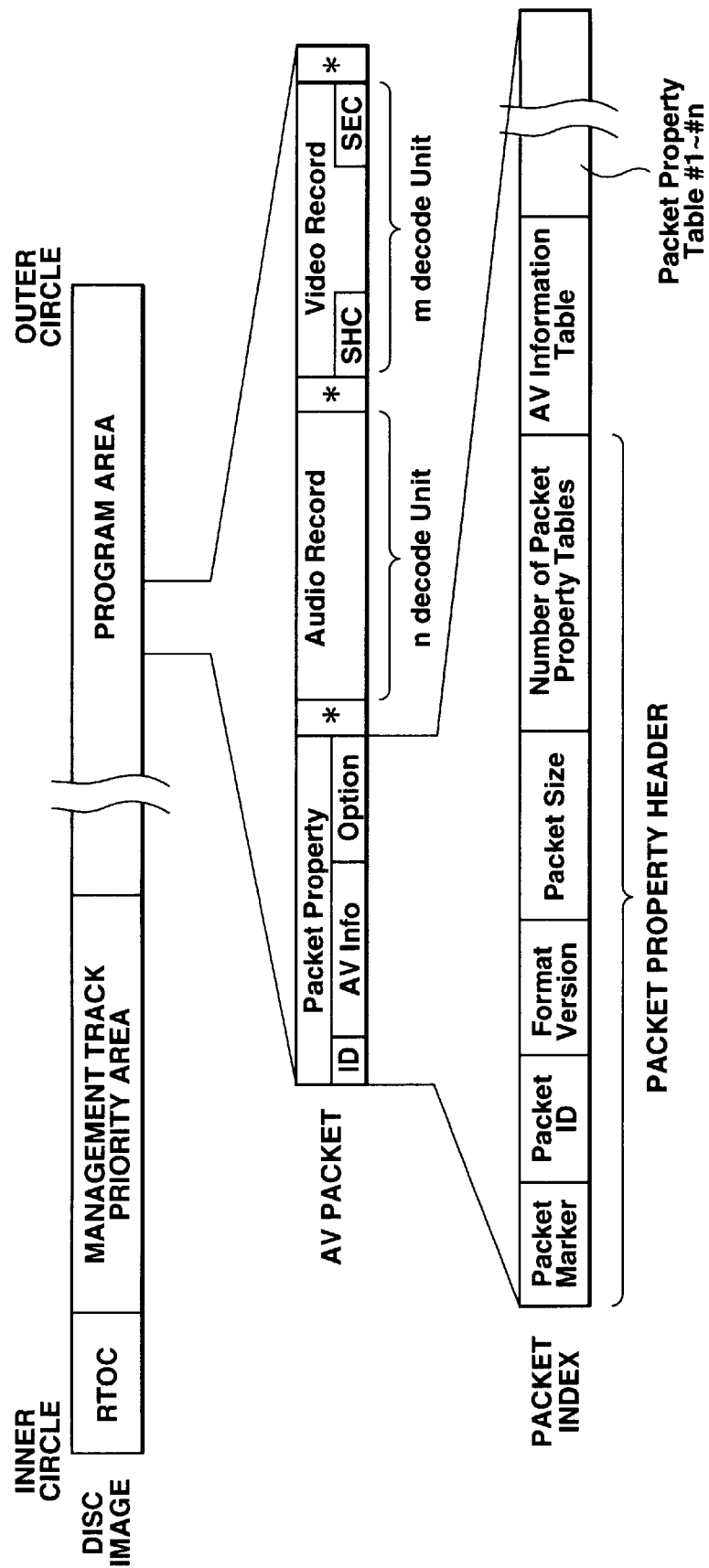
FIG. 12 schematically shows the structure of an AV packet on the disc.

The AV packet is constituted by an integer number of allocation units which are consecutive both physically and logically. The structure of one packet is shown in FIG. 12. Packet property, which records the recording conditions or the like, is arranged at the leading end of the packet, followed by audio record and video record in this order. The start position of each record is the position of bytes of a multiple of four from the leading end of the packet, and an unused area of an arbitrary length having 0 recorded therein can be arranged before and after each record.

The packet property is constituted by one packet property header and a plurality of packet property tables.

The packet property header arranged at the leading part of the packet property consists of 16 bytes, that is, packet marker (eight bytes), packet ID (four bytes), format version (two bytes), packet size (one byte), and number of packet property tables (one byte).

As the packet marker, a pattern (00h, 00h, 00h, 00h, FFh, FFh, 00h), 00h) indicating that this part is the leading part of the packet is recorded.

As the packet ID, ID (41h, 56h, 70h, 6 Bh) indicating the this packet is an AV packet is recorded.

As the format version, a code (0101h) indicating the present version is recorded.

As the packet size, the length of this entire packet is recorded on the cluster basis.

As the number of packet property tables, the number of packet property tables included in this packet property is recorded. Since an AV information table necessarily exists, the value of this number is always 1 or more.

In the packet property table, information relating to the audio record and video record included in this AV packet, and VBI data, characters and graphic data (TBD) that should be reproduced simultaneously with that information are recorded. While the AV information table must be recorded always at the leading part, the other tables are optional and arbitrary tables can be recorded in an arbitrary order. However, the same kind of packet property table must not be recorded a plurality of times in one packet property. Each table has a variable length, and the table ID and next table pointer are arranged at the leading part.

Figure 13:
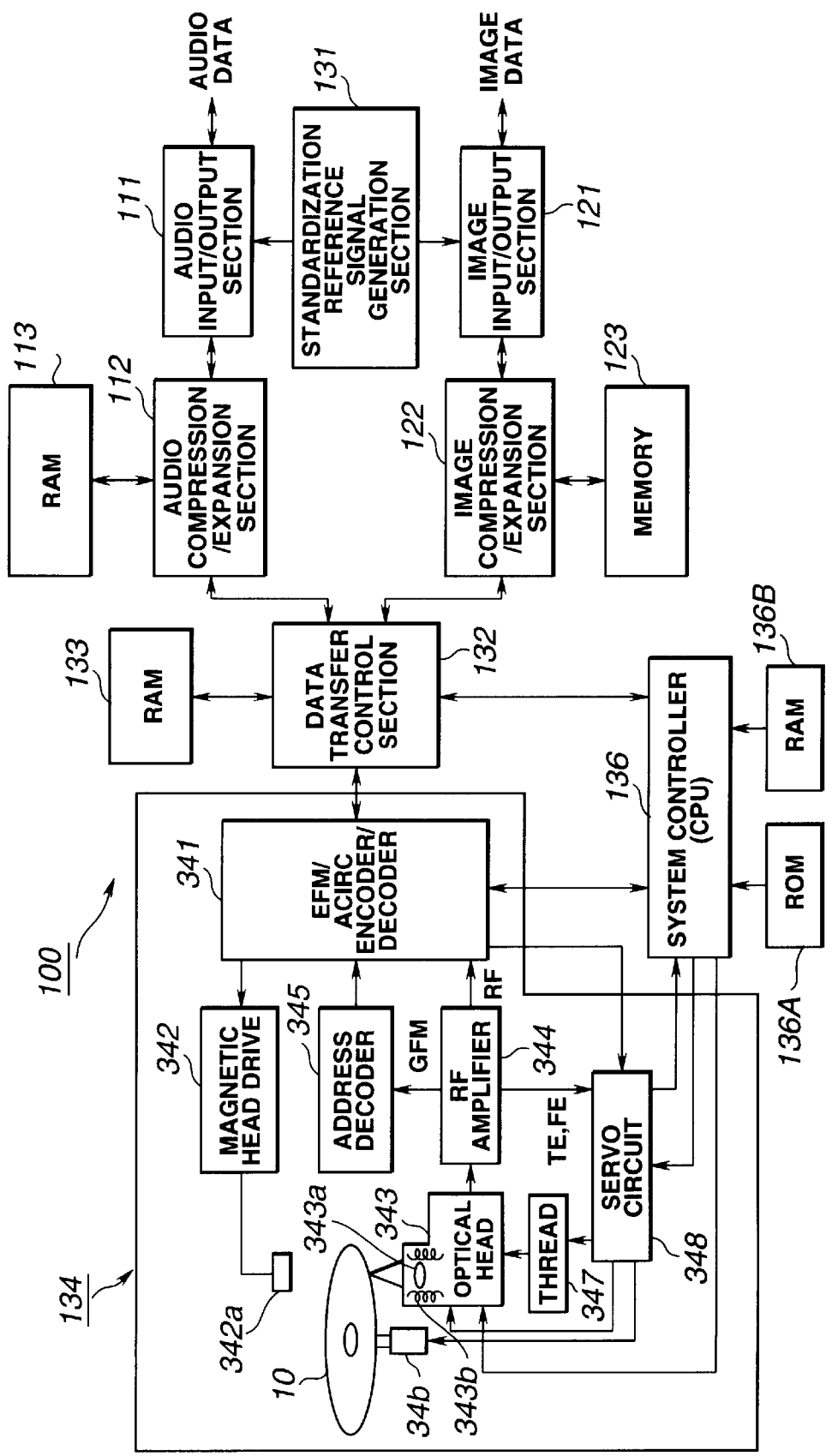
FIG. 13 is a block diagram showing the structure of an information recording/reproducing device for carrying out recording/reproduction of information to/from the disc.

FIG. 13 is a block diagram showing the structure of an information recording/reproducing device 100 for carrying out recording/reproduction of information using the disc 10.

This information recording/reproducing device 100 is constituted by an audio input/output section 111 for inputting and outputting audio data, an image input/output section 121 for inputting and outputting image data, a sampling reference signal generation section 131 for generating a reference signal to the audio input/output section 111 and the image input/output section 121, an audio compression/expansion section 112 for compressing/expanding audio data, a memory 113 for temporarily storing audio data, an image compression/expansion section 122 for compressing/expanding image data, a memory 123 for temporarily storing image data, a data transfer control section 132 for controlling transfer of audio data and image data, a memory 133 for temporarily storing the data controlled by the data transfer control section 132, a recording/reproducing section 134 for recording and reproducing data to and from the disc 10, a system controller 136 for controlling each of these blocks, and a program ROM 137 and a work RAM 138 connected to the system controller 136.

This information recording/reproducing device 100 is a magneto-optical recording/reproducing device for recording/reproducing information to/from the disc 10, which is a magneto-optical recording medium. The recording/reproducing section 134 has an encoder/decoder circuit 341 for decoding and coding data, a magnetic head driving circuit 342 for driving a magnetic head 342a, an optical head 343 for irradiating the disc 10 with a laser beam and detecting a reflected light thereof, an RF amplifier 344 for reproducing a focusing error signal (FE), a push-pull signal (PP) and a magneto-optical reproduction signal (MO) from the reflected light detected by the optical head 343, an address decoder 345 for reproducing a signal corresponding to a groove wobble formed in a guide groove on the disc 10 on the basis of the push-pull signal (PP) from the RF amplifier 344 and decoding ADIP, a spindle motor 346 for rotationally driving the disc 10, a thread mechanism 347 for driving the magnetic head 342*a* and the optical head 343 in the direction of radius of the disc 10, and a servo circuit 348 for controlling focusing servo, tracking servo, thread servo and spindle servo on the basis of the focusing error signal (FE) and the push-pull signal (PP) from the RF amplifier 344.

In this information recording/reproducing device 100, the disc 10 is rotationally driven by the spindle motor 346. The disc 10 is irradiated with a laser beam from the optical head 343 at the time of recording/reproduction.

The optical head 343 produces a laser output of a high level for heating a recording track up to the Curie temperature at the time of recording, and produces a laser output of a relatively low level for detecting data from a reflected light by the magnetic Kerr effect at the time of reproduction.

Therefore, a laser diode as laser output means, an optical system made up of a polarizing beam splitter, an objective lens and the like, and a detector for detecting a reflected light are provided in the optical head 343. An optical lens 343*a* is held displaceably in the direction of radius of the disc and in the direction toward and away from the disc by a biaxial mechanism 343*b*.

The magnetic head 342*a* is located at a position opposite to that of the optical head 343 with the disc 10 arranged between them. The magnetic head 342*a* operates to apply to the disc 10 a magnetic field modulated by data supplied thereto.

The whole optical head 343 and the magnetic head 342*a* are made movable in the direction of radius of the disc by the thread mechanism 347.

In the reproduction operation, information detected from the disc 10 by the optical head 343 is supplied to the RF amplifier 344. The RF amplifier 344 extracts a reproduction RF signal, a tracking error signal TE, a focusing error signal FE, and groove information GFM (absolute position information recorded as pre-groove (wobbling groove) on the disc 10), by arithmetic processing of the information supplied thereto.

The extracted reproduction RF signal is supplied to the encoder/decoder section 341. The tracking error signal TE and focusing error signal FE are supplied to the servo circuit 348, and the groove information GFM is supplied to the address decoder 345.

The servo circuit 348 generates various servo driving signals, in accordance with the focusing error signal (FE) and push-pull signal (PP) supplied thereto, a track jump command and an access command from the system controller 136 constituted by a microcomputer, and rotating speed detection information of the spindle motor 346. The servo circuit 348 thus controls the biaxial mechanism 343*b* and the thread mechanism 347, and also controls the spindle motor 346 at a constant linear velocity (CLV).

The address decoder 345 decodes the groove information GFM supplied thereto and extracts address information. This address information is supplied to the system controller 136, where it is used for various control operations.

The encoder/decoder section 341 binarizes the magneto-optical reproduction signal (MO) supplied from the RF amplifier 344, then demodulates the resultant signal by the EFM (eight-to-fourteen modulation) system, and carries out decoding processing for error correction by the CIRC (cross interleaved Reed-Solomon coding) system. The AV data, processed by EFM modulation and CIRC decoding by the encoder/decoder section 341, is temporarily written into the buffer memory 133 by the data transfer control section 132. Then, the audio data read out from the buffer memory 133 is supplied to the audio compression/expansions section 112, and the video data is supplied to the image compression/expansion section 122. The encoder/decoder section 341 also appends an error correction code of the CIRC system to a record signal supplied from the data transfer control section 132, then modulates the signal by the EFM system, and supplied the record signal to the magnetic head driving circuit 342. As for the reproduction RF signal, EFM modulation and CIRC decoding processing are carried out by the encoder/decoder section 341. In this case, the address and subcode data are also extracted and supplied to the system controller 136.

The recording system of this information recording/reproducing device 100 operates in the following manner.

That is, the audio input/output section 111 samples audio data, inputted from outside, with a predetermined code length in accordance with the reference signal generated by the sampling reference signal generation section 131, and outputs an audio sampled signal. The image input/output section 121 samples an image (dynamic image or still image), inputted from outside, with a predetermined code length in accordance with the reference signal generated by the sampling reference signal generation section 131, and outputs an image sampled signal.

The audio compression/expansion section 112 temporarily stores the audio sampled signal from the audio input/output section 111 into the memory 113, then reads out a predetermined number of data as a group, and converts the data to audio high-efficiency coded signals by a high-efficiency coding method such as ATRAC (adaptive transform acoustic coding) or the like.

The image compression/expansion section 122 temporarily stores the image sampled signal from the image input/output section 121 into the memory 123, then reads out a predetermined number of data as a group, and converts the data to image high-efficiency coded signals by a high-efficiency coding method such as MPEG or the like.

The data transfer control section 132 temporarily stores into the memory 133 the respective signals irregularly outputted from the audio compression/expansion section 112 and the image compression/expansion section 122. After that, the data transfer control section 132 reads out each predetermined unit of the respective signals from the memory 133 in accordance with the instruction from the system controller 136, then multiplexes the signals and appends identification information thereto. The signal having the identification information appended thereto is outputted at an appropriate transfer speed and appropriate timing for the recording/reproducing section 134. However, multiplexing and appending of the identification information may be carried out at the time of storage to the memory 133.

Then, in the recording/reproducing section 134, an error correction signal of the CIRC system is appended to the record signal supplied from the data transfer control section 132 in accordance with the instruction from the system controller 136. Moreover, modulation in accordance with the EFM system is carried out and the resultant record signal is supplied to the magnetic head driving circuit 342 so as to record the data to the disc 10. At this point, the system controller 136 supplies a control signal to the optical head 343 so as to output a laser bean of the recording level.

The reproducing system of the information recording/reproducing device 100 operates in the following manner.

That is, the recording/reproducing section 134 binarizes the magneto-optical reproduction signal (MO) read out from the disc 10 in accordance with the instruction from the system controller 136, then demodulates the signal by the EFM system, and carries out decoding processing for error correction in accordance with the CIRC system, thereby reproducing the AV data. Then, this AV data is temporarily written into the buffer memory 133 by the data transfer control section 132. The reading of the data from the disc 10 by the optical head 343 and the transfer of the reproduction data in the system from the optical head 343 to the buffer memory 133 are carries out at a rate of 8.7 Mbits/sec, and normally intermittently. The data written into the buffer memory 133 is read out at such timing that the transfer rate of the reproduction data is 0.3 Mbits/sec (ATRAC) and 4 to 8 bits/sec (MPEG). The audio data is supplied to the audio compression/expansion section 112 and the video data is supplied to the image compression/expansion section 122.

The audio compression/expansion section 112 expands the input signal in the reverse procedure of the compression procedure, then stores the expanded signal into the memory 113, reads out the signal in accordance with the order for recording, and outputs the signal as an audio sampled signal. The image compression/expansion section 122 expands the input signal in the reverse procedure of the compression procedure, then stores the expanded signal into the memory 123, reads out the signal in accordance with the order for recording, and outputs the signal as a video sampled signal.

After that, the audio input/output section 111 converts the audio sampled signal outputted from the audio compression/expansion section 112 to an audio signal in accordance with the reference signal generated from the sampling reference signal generation section 131, and outputs the audio signal to outside. The image input/output section 121 converts the image sampled signal outputted from the image compression/expansion section 122 to an image signal in accordance with the reference signal generated from the sampling reference signal generation section 131, and outputs the image signal to outside.

Figure 14:
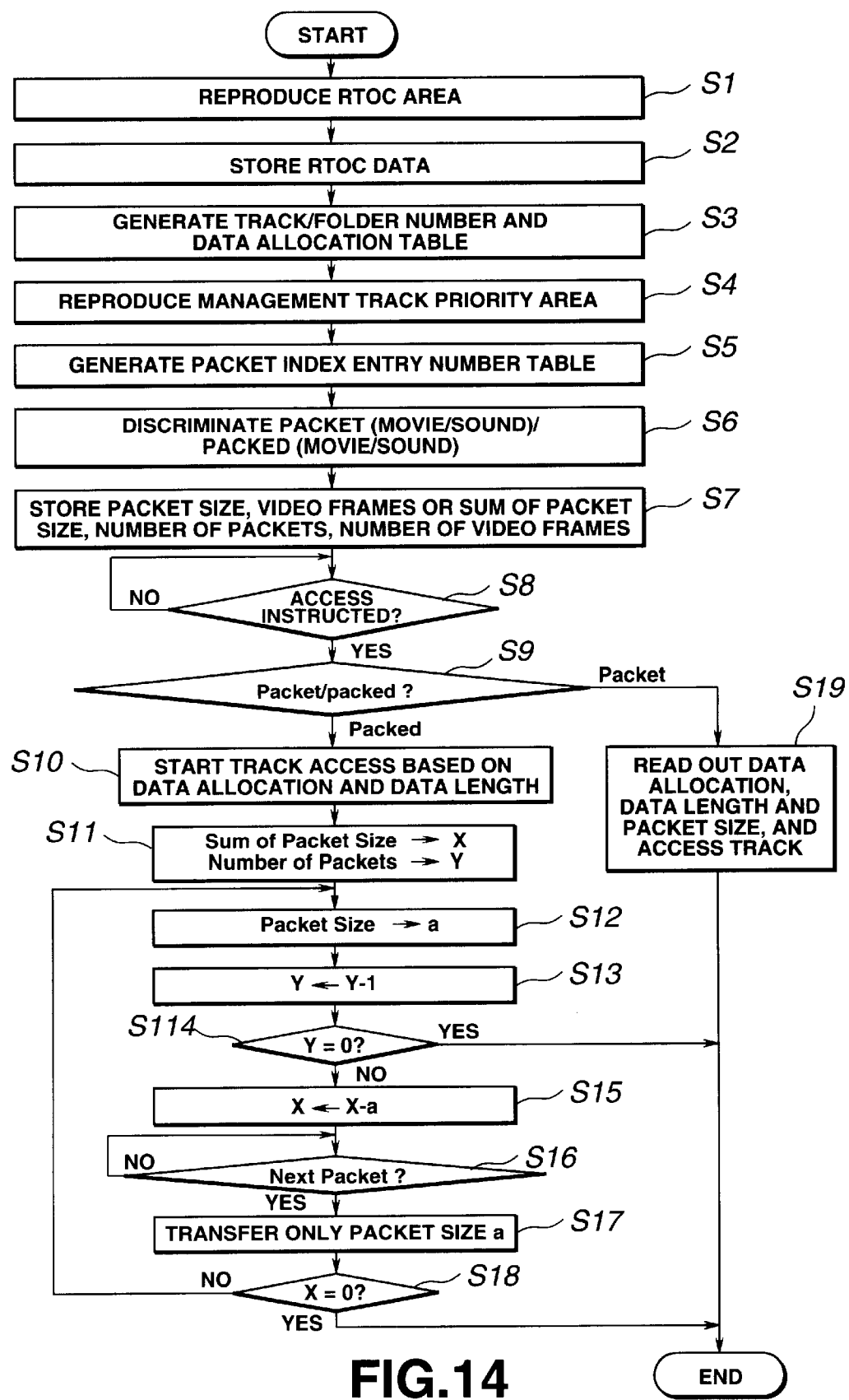
FIG. 14 is a flowchart showing the procedure of access control of a track by a system controller in the information recording/reproducing device.

The system controller 136 in the information recording/reproducing device 100 is constituted by a CPU or the like and carries out control operation as shown in the flowchart of FIG. 14 in accordance with a control command such as recording/reproduction or start/end inputted from outside. In the program ROM 136A connected to the system controller 136, programs for realizing various operations in the recording/reproducing device 100 are stored. In the work RAM 136B, data and programs necessary for the system controller 136 to execute various processing are suitably held.

Specifically, the system controller 136 first reproduces RTOC information from the RTOC area 14A on the disc 10 loaded in the information recording/reproducing device 100 (step S1), and stores the reproduced RTOC information to the work RAM 136B (step S2).

Next, the system controller 136 produces the track/folder number and data allocation and data length table on the work RAM 136B on the basis of the track/folder descriptor included in the track description table (TDT) in the track management system (TMS) (step S3).

Then, the system controller 136 reproduces the management track priority area in the recordable data area shown in FIG. 7 (step S4).

Then, with reference to the entry number included in the packet index table in the volume index track corresponding to the track/folder number, the system controller 136 extracts the packet index entry number included in the corresponding shot property, and produces a table on the work RAM 136B (step S5).

Moreover, with reference to the entry number included in the packet index table in the volume index track corresponding to the packet index entry number, the system controller 136 discriminates packet (movie/sound) or packed (movie/sound) on the basis of the index attributes (step S6).

Then, the system controller 136 obtains the packet size, video frames or sum of packet size, number of packets, number of video frames, and stores them to the work RAM 136B (step S7).

Next, the system controller 136 waits for an access instruction from the user (step S8), and refers to the entry number of the property table in the work RAM 136B on the basis of the ID corresponding to the track designated by the access instruction. The system controller 136 refers to the packet index entry number in the shot property corresponding to the entry number referred to. The system controller 136 then discriminates whether the packet index corresponding to the packet index entry number is the packet (movie/sound) or packed (movie/sound), on the basis of the index attributes (step S9).

If the result of discrimination at step S9 is "packed", that is, if the track designated by the access instruction is the packed index (movie/sound), the system controller 136 starts access in accordance with the data allocation and data length corresponding to the track number designated by the access instruction, on the basis of the track/folder number and data allocation and data length table on the work RAM 136B (step S10).

Next, the system controller 136 reads out the sum of packet size and the number of packets included in the packed index (movie/sound) on the work RAM 136B, and substitutes them for the variables X and Y (step S11).

The system controller 136 then substitutes the packet size included in the packet property reproduced after the access, for the variable "a" (step S12).

Since the access to one pack constituting the packed index has been completed, a decrement of 1 is made on the variable Y (step S13), and it is discriminated whether the variable Y is 0 or not (step S14).

If the result of discrimination at step S14 is "NO", that is, if the variable Y is not 0, it is determined that the access to all the packs constituting the packed index has not been completed. To newly calculate the total data length of the remaining packs constituting the packed index, the system controller 136 modifies the variable X to X–a (step S15).

Next, the system controller 136 discriminates whether or not there is an access instruction with respect to the next packet (step S16). If there is an access instruction with respect to the next packet, the system controller 136 makes transfer by the variable "a", that is, by the packet size (step S17).

Then, the system controller 136 discriminates whether the variable X is 0 or not (step S18).

If the result of discrimination at step S18 is "NO", that is, if the variable X is not 0, it is determined that the access to all the packs constituting the packed index has not been completed. The system controller 136 returns to step S12 and repeats the processing of steps S12 to S18, thus accessing the track designated by the access instruction.

If the result of discrimination at step S14 or step S18 is "YES", that is, if the variable Y is 0, or if the variable X is 0, it is determined that the access to all the packs constituting the packed index has been completed. The system controller 136 ends access to the track designated by the access instruction.

If the result of discrimination at step S9 is "packet", that is, if the track designated by the access instruction is the packet (movie/sound), the system controller 136 reads out the data allocation, data length and packet size corresponding to the track number designated by the access instruction, from the track/folder number and data allocation and data length table on the work RAM 140, and carries out access to the track designated by the access instruction (step S19).

Figures 15A, 15B:
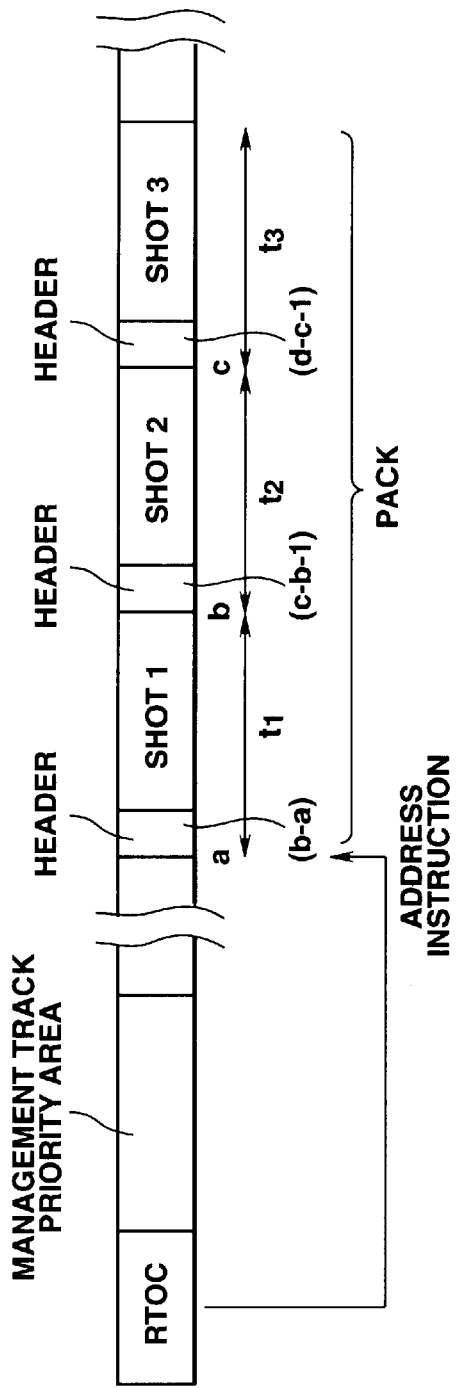
FIGS. 15A and 15B schematically show a disc image of the disc and the management form of its management area TOC.

Specifically, in the system controller 136 of the information recording/reproducing device 100, a header is appended to each shot recorded in the program area, and the data length of each shot is managed at the header, as shown in the disc image of FIG. 15A and the management form of the management area TOC of FIG. 15B. Moreover, the plurality of shots are grouped into one pack, and the leading recording start position of the pack (that is, the recording start position "a" of shot 1) is managed in the RTOC. Furthermore, the number of packets included in the pack and the data length (sum of packet size) of the whole pack are managed in the management track priority area. In this example, the number of packets is 3 and (t1+t2+t3) is managed as the sum of packet size, as shown in FIG. 15B. By thus carrying out batched management of a plurality of shots, the table in the management area can be saved.

In the case where each of plural files (packets) grouped to be handled as a pack is managed as "packed *index", each packet is not managed doubly as "*packed index". "***" represents either "movie" or "sound".

Figure 16:
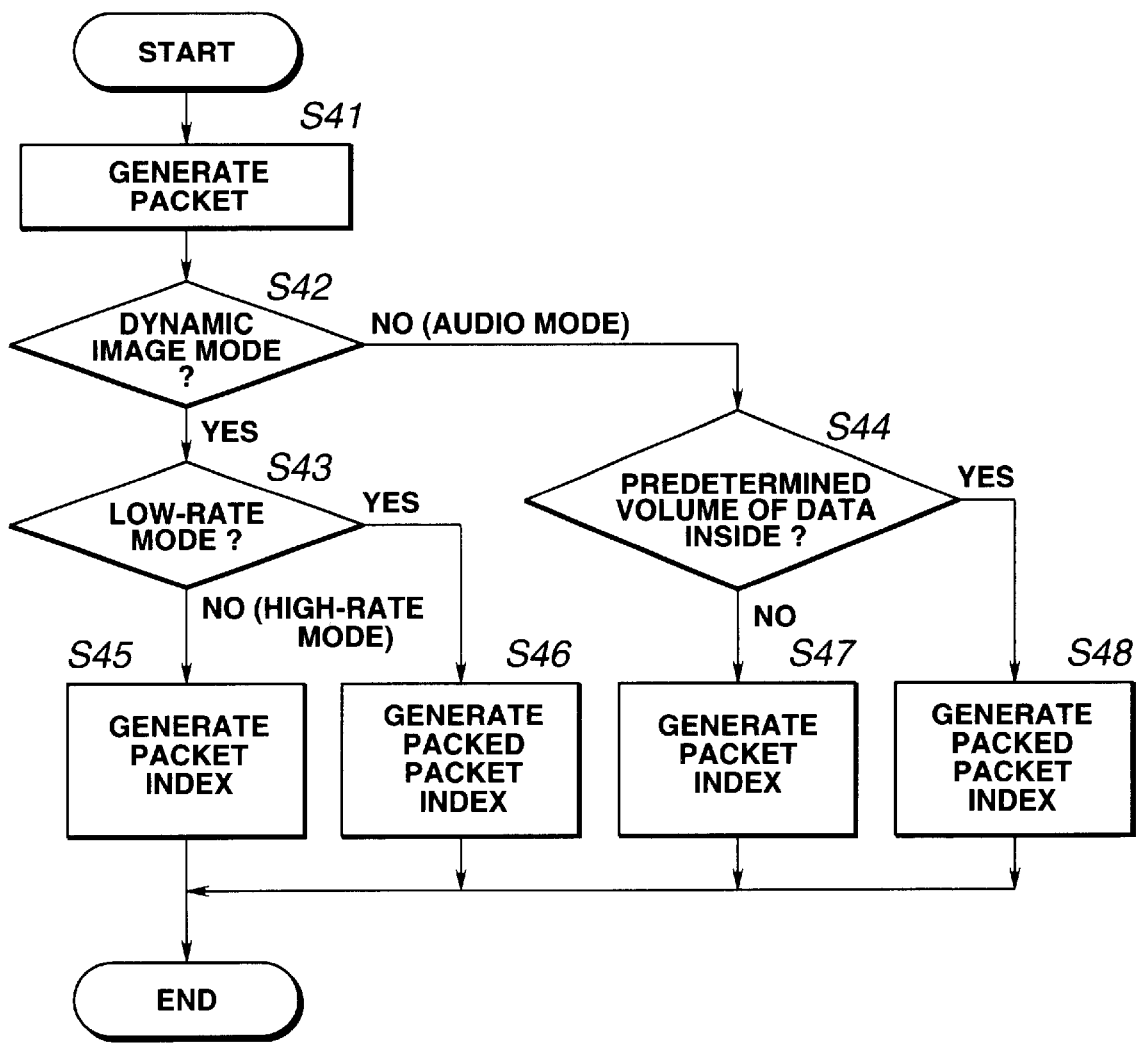
FIG. 16 is a flowchart showing the procedure of generating the packet index of each packet by the system controller in the information recording/reproducing device.

In the information recording/reproducing device 100, the system controller 136 generates the packet index of each packet in accordance with the procedure shown in the flowchart of FIG. 16.

Specifically, the system controller 136 generates a packet of information to be recorded in accordance with a predetermined format (step S41), and discriminates whether the data is of the dynamic image mode or not (step S42).

If the result of discrimination at step S42 is "YES", that is, if the data is of the dynamic image mode, the system controller 136 discriminates whether the packet is of the low-rate mode or not (step S43).

If the result of discrimination at step S43 is "NO", that is, if it is discriminated that the packet is of the high-rate mode, the system controller 136 generates the index for that packet alone, that is, the packet index (step S45). If the result of discrimination at step S43 is "YES", that is, if the packet is of the low-rate mode, the system controller 136 generates the index of an information record pack consisting of a plurality of consecutive packets, that is, the packed packet index (step S46).

If the result of discrimination at step S42 is "NO", that is, if the data is of the audio mode, the system controller discriminates whether a predetermined quantity of data is provided or not (step S44).

If the result of discrimination at step S44 is "NO", that is, if a predetermined quantity of data is not provided, the system controller generates the index for the packet alone, that is, the packet index (step S47). If the result of discrimination is "YES", that is, if a predetermined quantity of data is provided, the system controller generates the index of an information record pack consisting of a plurality of consecutive packets, that is, the packed packet index (step S48).

As described above, by the batched management of a plurality of files (packets) of a low-quality image as the packed packet index, the finite packet index for managing the packets can be saved. Moreover, by automatically switching the management of files using the packed packet index and the management of files using the packet index in accordance with the data quantity of digital audio signals stored in the memory, consecutive digital audio signals are managed in a batched manner using the packed packet index.

What is claimed is:

1. A recording medium comprising:
   a program area in which a plurality of aggregated unit packets are discretely recorded as a pack, each packet comprising of a header section having data length of the entire packet managed therein and a main data section;
   a first management area for managing the recording address of the packets in the program area; and
   a second management area in which the total number of packets included in the pack of the plurality of aggregated packets and the total length of data included in the pack of the plurality of aggregated packets are managed.

2. The recording medium as claimed in claim 1, wherein the total number of frames included in the pack of the plurality of aggregated packets is managed further in the second management area.

3. The recording medium as claimed in claim 1, wherein the data length of each packet, the number of frames included in each packet, and a descriptor for identifying the type of each packet are managed further in the second management area.

4. The recording medium as claimed in claim 3, wherein the descriptor for identifying the type of each packet is adapted for identifying whether the main data section of the packet is video information or audio information.

5. A reproducing device for reproducing data from a recording medium including a program area in which a plurality of aggregated unit packets are discretely recorded as a pack, each packet comprising of a header section having data length of the entire packet managed therein and a main data section, a first management area for managing the recording address of the packets in the program area, and a second management area in which the total number of packets included in the pack of the plurality of aggregated packets and the total length of data included in the packet of the plurality of aggregated packets are managed, the reproducing device comprising:
   reproducing means for reproducing the first management are, the second management area and the program area;
   storage means for storing management information reproduced from the first management area and the second management area by the reproducing means; and
   control means for controlling transfer of the reproducing means on the basis of the management information stored in the storage means when access to an arbitrary pack of the plurality of aggregated packets is instructed.

6. The reproducing device as claimed in claim 5, wherein the total number of frames included in the pack of the plurality of aggregated packets is managed further in the second management area.

7. The reproducing device as claimed in claim 5, wherein the data length of each packet, the number of frames included in each packet, and a descriptor for identifying the type of each packet are managed further in the second management area.

8. The reproducing device as claimed in claim 5, wherein in the case where access to the arbitrary pack is instructed, the control means transfers the reproducing means to a leading packet constituting the pack on the basis of the recording address of the first management area stored in the storage means, and after completion of the transfer, carries out access control to individual packs sequentially constituting the packet on the basis of the data length included in the header section of the packet reproduced by the reproducing means and the number of packets and the total data length in the second management area stored in the storage means.

9. The reproducing device as claimed in claim 7, wherein the descriptor for identifying the type of each packet is adapted for identifying whether the main data section of the packet is video information or audio information.

10. A recording device for recording digital video signals to a recording medium including a program area in which a plurality of aggregated unit packets are discretely recorded, each packet consisting of a header section having management information recorded therein and a main data section, and a management area in which first management information comprising of the total number of packets included in a pack of the plurality of aggregated packets and the total length of data included in the pack of the plurality of aggregated packets or second management information comprising of the data length of each of the packets is selectively managed, the recording device comprising:
blocking means for blocking inputted digital video signals by each predetermined length;
discrimination means for discriminating the quality of the blocked digital video signals;
first management information generation means for generating the first management information in the case where it is discriminated by the discrimination means that the digital video signals have low quality; and
recording means for recording the first management information generated by the first management information generation means to the management area.

11. The recording device as claimed in claim 10, further comprising second management information generation means for generating the second management information in the case where it is discriminated by the discrimination means that the digital video signals have high quality,
the recording means recording the second management information generated by the second management information generation means to the management area.

12. A recording device for recording digital audio signals to a recording medium including a program area in which a plurality of aggregated unit packets are discretely recorded, each packet comprising of a head section having management information recorded therein and a main data section, and a management area in which first management information comprising of the total number of packets included in a pack of the plurality of aggregated packets and the total length of data included in the pack of the plurality of aggregated packets or second management information comprising of the data length of each of the packets is selectively managed, the recording device comprising:
blocking means for blocking inputted digital audio signals by each predetermined length;
memory means for storing the blocked digital audio signals;
discrimination means for discriminating the quality of data stored in the memory means;
first management information generation means for generating the first management information in the case where it is discriminated by the discrimination means that a predetermined quantity or more of the blocked digital audio signals are stored in the memory means; and
recording means for recording the first management information generated by the first management information generation means to the management area.

13. The recording device as claimed in claim 12, further comprising second management information generation means for generating the second management information in the case where it is discriminated by the discrimination means that a predetermined quantity or less of the blocked digital audio signals are stored in the memory means,
the recording means recording the second management information generated by the second management information generation means to the management area.

14. A reproducing method for reproducing data from a recording medium including a program area in which a plurality of aggregated unit packets are discretely recorded as a pack, each packet comprising of a header section having data length of the entire packet managed therein and a main data section, a first management area for managing the recording address of the packets in the program area, and a second recording area in which the total number of packets included in the pack of the plurality of aggregated packets and the total length of data included in the pack of the plurality of aggregated packets are managed, the reproducing method comprising:
a step of reproducing the first management area, the second management area and the program area;
a step of storing management information reproduced from the first management area and the second management area to a memory;
a step of discriminating the presence/absence of an instruction to access an arbitrary pack of the plurality of aggregated packets; and
a step of accessing an arbitrary packet designated by the access instruction on the basis of the management information stored in the memory.

15. The reproducing method as claimed in claim 14, further comprising:
a step of accessing a leading packet constituting the pack on the basis of the recording address of the first management area stored in the memory in the case where access to the arbitrary pack is instructed; and
a step of accessing, after completion of the access, individual packs sequentially constituting the packet on the basis of the data length included in the header section of the accessed packet and the number of packets and the total data length of the second management area stored in the memory.

16. A recording method for recording digital video signals to a recording medium including a program area in which a plurality of aggregated unit packets are discretely recorded as a pack, each packet comprising of a header section having data length of the entire packet managed therein and a main data section, and a management area in which first management information for managing the total number of packets included in a pack of the plurality of aggregated packets and the total length of data included in the pack of the plurality of aggregated packets or second management information for managing the data length of each of the packets is selectively managed, the recording method comprising:
a step of discriminating the quality of blocked digital video signals;
a step of generating the first management information in the case where it is discriminated at the step of discriminating that the blocked digital video signals have low quality; and
a step of recording the generated first management information to the management area.

17. The recording method as claimed in claim 16, further comprising:

a step of generating the second management information in the case where it is discriminated at the step of discriminating that the blocked digital video signals have high quality; and a step of recording the generated second management information to the management area.

18. A recording method for recording digital audio signals to a recording medium including a program area in which a plurality of aggregated unit packets are discretely recorded as a pack, each packet comprising of a header section having data length of the entire packet managed therein and a main data section, and a management area in which first management information for managing the total number of packets included in a pack of the plurality of aggregated packets and the total length of data included in the pack of the plurality of aggregated packets or second management information for managing the data length of each of the packets is selectively managed, the recording method comprising:

a step of blocking inputted digital audio signals;

a step of storing the blocked digital audio signals to a memory;

a step of discriminating whether the quantity of digital audio signals stored in the memory is equal to or greater than a predetermined quantity;

a step of generating the first management information in the case where it is discriminated at the step of discriminating that the quantity of blocked digital audio signals stored in the memory is equal to or greater than a predetermined quantity; and a step of recording the generated first management information to the management area.

19. The recording method as claimed in claim 18, further comprising:

a step of generating the second management information in the case where it is discriminated at the step of discriminating that a predetermined quantity or less of the block digital audio signals are stored in the memory; and a step of recording the generated second management information to the management area.

* * * * *